United States Patent [19]
Barrett

[11] Patent Number: 5,587,892
[45] Date of Patent: Dec. 24, 1996

[54] MULTI-PHASE POWER CONVERTER WITH HARMONIC NEUTRALIZATION

[75] Inventor: Alfred H. Barrett, Carmel, Ind.

[73] Assignee: Delco Electronics Corp., Kokomo, Ind.

[21] Appl. No.: 317,457

[22] Filed: Oct. 4, 1994

[51] Int. Cl.$^6$ ................................................. H02M 3/335
[52] U.S. Cl. .................................................. 363/44; 363/16
[58] Field of Search ................................. 323/205, 207; 363/15, 16, 17, 37, 38, 39, 40, 41, 42, 97, 131–133, 24–26, 97–98, 91, 44

[56] References Cited

U.S. PATENT DOCUMENTS

| Re. 27,916 | 2/1974 | Kakalec | 323/61 |
|---|---|---|---|
| Re. 28,359 | 3/1975 | Hart et al. | 323/56 |
| 2,143,745 | 8/1938 | Sola | 171/119 |
| 2,896,180 | 7/1959 | Brown | 336/155 |
| 2,938,180 | 5/1960 | DeWitz | 333/78 |
| 3,122,699 | 2/1964 | Schohan | 323/83 |
| 3,148,326 | 9/1964 | Baycura et al. | 323/56 |
| 3,253,212 | 9/1966 | Wentworth | 323/56 |
| 3,525,035 | 8/1970 | Kakalec | 323/61 |
| 3,573,605 | 4/1971 | Hart et al. | 323/56 |
| 3,573,606 | 4/1971 | Hart et al. | 323/60 |
| 3,965,408 | 6/1976 | Higuchi et al. | 321/25 |
| 5,146,396 | 9/1992 | Eng et al. | 363/16 |

Primary Examiner—Stuart N. Hecker
Assistant Examiner—Aditya Krishnan
Attorney, Agent, or Firm—Mark A. Navarre

[57] ABSTRACT

A multi-phase AC to DC harmonic neutralizing power converter. The power converter includes a plurality of inputs for respective phases of a multi-phase source of AC power and a plurality of first rectifiers connected respectively to the inputs. A multi-phase harmonic neutralizing converter includes a power switching inverter having an input connected to the outputs of each of the first rectifiers, the inverter including LC resonant circuits. A plurality of second rectifiers having respective inputs connected to the output of the inverter through a plurality of respective transformers having outputs that are connected in voltage additive relationship to the outputs of the respective individual phase first rectifiers. A single set of power switches is utilized to neutralize multiple input power phases.

16 Claims, 11 Drawing Sheets

MULTI-PHASE POWER CONVERTER WITH HARMONIC NEUTRALIZATION

BACKGROUND OF THE INVENTION

1. Field of the Invention

The present invention relates to AC-DC power converters, and, more particularly, to the provision of a multi-phase resonant power converter having harmonic neutralization that has application in battery chargers and power supplies for automotive, industrial, and a variety of consumer applications.

2. Description of the Related Art

Some electric loads cause the generation of harmonic currents on the power supply to which these loads are connected. These harmonic currents are undesirable as they cause non-optimal use of the power source by the loads. As a consequence, some European countries have imposed stringent requirements for the elimination of such harmonics, referred to herein as "harmonic neutralization", through the standard known as IEC 555-2. Other countries are contemplating the requirement for harmonic neutralization.

Certain types of electrical loads, such as electrical heating units, are inherently free from the generation of harmonic currents while others such as power supply type loads, normally produce large harmonics of current. For example, when an ordinary AC input power converter is operated from the power source provided by the electric utility service, the power converter is likely to produce harmonic current. Specifically, though the power source has a sinusoidal voltage, such as the 60 Hz power source provided in the United States, the power converter connected to the sinusoidal voltage power source draws non-sinusoidal current. The current drawn by the power converter often has a distortion content which ranges from 25 to 150% thereby creating low-frequency conducted interference and unduly taxing the current supplying capacity of the power source.

When a power converter includes harmonic neutralization, the power converter ideally draws sinusoidal current from the sinusoidal voltage power source. The harmonic neutralizing power converter does not create low-frequency conducted interference, and, if the converter's input current is in phase with its input voltage, the converter provides optimum utilization of the power source. Under these circumstances, the power converter looks like a linear resistive load to the power source and the power factor of the converter is unity —the optimum.

The employment of harmonic neutralization is well known in the art in switchmode, i.e., in pulse-width modulation (PWM), power supplies. Several circuit topologies exist which, when used with PWM and suitable control loops, meet current harmonic neutralization standards. Some of the these topologies support outputs of several hundred watts. Industrial loads, ranging up to and beyond a kilowatt and which normally generate large harmonic currents, are sometimes supplied by power conditioning equipment employing active and/or passive harmonic neutralization circuits to meet harmonic neutralization standards. However, the use of PWM to achieve harmonic neutralization is limited from an implementation viewpoint in many respects. First, power converters using PWM for harmonic neutralization are costly to manufacture, usually require additional control of electromagnetic interference (EMI), are of significant size and weight, operate inefficiently at high frequencies, and adapt poorly to induction coupling. Induction coupling is desirable in some applications, such as in providing for easier, safer, and more reliable battery charging. The likelihood of the imposition of harmonic neutralization standards as in the United States and the retention of existing standards as in Europe makes it desirable to develop a power converter which does not possess the aforementioned limitations of PWM power supplies.

Resonant converters are advantageous over switchmode (PWM) converters for several reasons which are discussed hereinafter. Therefore, resonant converters may serve as a viable alternative to PWM converters if harmonic neutralization can be achieved with resonant converter topology. Though the basic concepts involving resonance in electrical circuits were developed during the early days of the development of radio technology over fifty years ago, the evolution of resonant technology has been generally limited to the resolution of specific problems, e.g. the commutation of silicon controlled rectifiers (SCRs). A brief look at the history of power supplies is instructional when comparing PWM converters to resonant converters.

Early power supplies often used a line frequency power transformer and a linear regulator consisting of vacuum tubes or, in later supplies, power transistors. These early power supplies were generally large, heavy and inefficient. DC-DC type power supplies used mechanical vibrators, vacuum tubes or switching power transistors to accomplish inversion (DC to AC transformation) when isolation or a significant voltage transformation was required. When vacuum tubes or switching transistors were employed, the regulation function of the power supply was often accomplished by PWM or by pulse-frequency modulation. The introduction of silicon power transistors, which were capable of dissipating several hundred watts and switching in a few microseconds, had an impact on the popularity of PWM for regulation. Today, PWM still prevails as the means for regulating a vast majority of commercially available power supplies.

The availability of high speed silicon power transistors resulted in the emergence of PWM power supplies having increasingly higher feasible power levels. However, these power supplies were generally limited to only a few kilowatts. In the late 1960's the SCR became available for use in operation at several kilowatts and above. However, because the SCR has no means by which it can interrupt its own current flow, i.e., self-commutate, forced commutation was necessary for the SCR to operate in DC systems. The need for forced commutation prompted the development of resonant circuits in which ringing is used to produce a reversal in current flow. Similarly, since the mid-1980's, resonant power technology is utilized with increased frequency in power circuits due to the introduction of other switching devices such as bipolar transistors, MOSFETs, IGBTs, etc. Though these devices, unlike SCRs, do not necessarily require the use of resonance for commutation, resonance can be employed where it is advantageous over PWM, such as at high operating frequencies.

When operated at the resonant frequency of its tank circuit (as used herein, the term "tank" refers to the combination of a transformer or inductor and the resonant capacitor connected thereto), the resonant converter has a pure sine wave of tank current at that frequency. Therefore, at the time the square wave of excitation voltage produces a voltage transition on its power switching devices, these devices, in resonant converters, are not necessarily conducting current. Low switching losses are produced in these devices when the current is zero. Thus this condition, commonly referred to as zero-current switching, is desirable. With resonant converters the dominant loss is conduction loss. However, conduction losses are not strongly related to operating frequency and, therefore, the resonant converter can operate efficiently at a high frequency. For example, a resonant converter can be designed to operate efficiently at a frequency that is typically five to ten times higher than a PWM converter of the same power level using the same power switching devices.

A resonant converter is further advantageous as it produces little electromagnetic interference (EMI). Because a resonant converter develops a sinusoid of current, as opposed to a fast rising quasi-square wave, little EMI is produced. Further, the components of the resonant converter are generally fewer in number and less costly than the components required for a PWM converter. The resonant converter's components are also of a smaller volume and weight thereby permitting applicability of the converter in a smaller or more weight sensitive environment than is possible with PWM. It is therefore desired to provide a power converter having harmonic neutralization which uses resonant power technology to gain the advantages inherently provided by resonant converters.

As previously mentioned, resonant converters are known to be advantageous for having low switching loss. However, there are problems associated with the use of resonant converters that should be considered. For example, switching losses may be created when the output of the resonant converter is controlled over a wide range. Specifically, the output voltage or current of a resonant converter is typically controlled by changing its operating frequency over a range of frequencies above or below the converter's resonant frequency. When the operating frequency is above or below the resonant frequency, the tank current is out of phase with the excitation voltage. Generally, this phase difference creates switching loss and may increase EMI as well. Specifically, such losses may occur over an operating frequency range which extends from several times the resonant frequency down to one-half (½) the resonant frequency.

Another problem occurs when the operating frequency is close to the resonant frequency. In such a situation, the voltage or current in the tank components is strongly related to the Q of the circuit. Thus, the control curves are highly nonlinear and strongly affected by the load. Therefore, it is desired to provide a controlled power converter using resonant power technology and having harmonic neutralization which avoids the problems encountered when the converter is controlled by changes to the converter's operating frequency.

Yet another potential problem associated with the resonant converter is the conductive losses that may be generated. A resonant converter may have significantly higher conduction loss than is generated with a PWM converter. However, if the switching losses of the resonant converter is minimized as described hereinabove, the resonant converter can still incur lower total loss than the PWM converter. Thus, the resonant converter's conductive losses do not preclude its desirability over the use of PWM converters.

As previously stated, the problem of switching loss for a resonant converter can be eliminated when the series resonant converter operates at a frequency below one-half of its resonant frequency. If the controlled switches of the resonant converter are turned off prior to the initiation of a second cycle of ringing, current in the tank circuit ceases to flow. This mode of operation of a resonant converter is referred to herein as the "discontinuous current mode of operation". When in the discontinuous current mode of operation, the resonant converter can have a constant on-time drive.

A series resonant converter not only has low switching loss in all of its switching components if operated at and/or below one-half of its resonant frequency, but is also advantageous over other resonant converters due to its low component count. Further, over an operating frequency range from zero to one-half of its resonant frequency, a series resonant converter s output current is nearly linearly proportional to its operating frequency, the tank current waveform is nearly independent of the repetition rate, and the average current output is proportional to the repetition rate.

When operating in the discontinuous current mode, the output current of a series resonant converter is quite independent of its output voltage. Specifically, from zero output voltage to an output voltage at which the input/output voltage transformation ratio is approximately unity (1.0), the output current of a series resonant converter operating in discontinuous current mode is nearly constant. At output voltages reaching a voltage transformation ratio of unity, the output current falls off rapidly as the output voltage exceeds the tank excitation voltage and the tank becomes unloaded. In addition to the provision of an essentially constant output current, the series resonant converter tolerates any passive load and needs no protection circuitry to limit its output voltage or current. Therefore, it is desirable to employ a series resonant converter topology for a power converter having harmonic neutralization to utilize the aforementioned advantages inherently provided with series resonant converters.

A series resonant topology is utilized in an AC to DC converter in U.S. Pat. No. 4,143,414 to result in a reduction in harmonic current distortion. Each phase of the three-phase AC source is first rectified by a full-wave bridge rectifier to convert the AC phase voltage to a rectified DC voltage. Each DC voltage is in turn provided to a resonant bridge inverter to invert the DC voltage to an AC voltage. Then, the AC voltage is converted by another full-wave rectifier to a full-wave rectified DC voltage. The combination of the series resonant bridge inverter and the second full-wave bridge rectifier behaves somewhat like a resistive load for the first full-wave rectifier to reduce the harmonic current distortion produced in the three-phase AC voltage source. However, though a reduction in harmonic distortion occurs, current harmonics are generated in each phase of the three-phase source because the DC to DC rectifiers (the combination of the series resonant bridge inverter and the second full-wave bridge rectifier) are non-linear and do not present an ideally resistive load. As a consequence, additional circuitry is used in the converter of U.S. Pat. No. 4,143,414 to eliminate the harmonic current generated by the DC to DC rectifiers.

Therefore, it is desired to develop a multi-phase harmonic neutralizing power converter using series resonant topology which requires a minimal number of components to achieve neutralization and which does not generate its own harmonics which must be eliminated through the use of additional circuitry.

SUMMARY OF THE INVENTION

The present invention provides a multi-phase harmonic neutralizing power converter. The power converter employs series resonant topology to capitalize on the inherent advantage of such topology over pulse-width modulation converters.

The invention, in one form thereof, constitutes a new circuit topology which utilizes a multi-stage resonant converter. One stage provides for isolation, particularly when utilizing an induction port drive, and the other stages are utilized for harmonic neutralization. A unique feature of the circuit of the present invention is that it requires a single power switching stage to provide regulated and galvanically isolated power output. At the same time, it provides harmonic neutralization on n input phases where n=1,2,3, . . . .

The invention is a multi-phase AC to DC power converter including a plurality of inputs for respective phases of a multi-phase source of AC power, a plurality of first rectifiers connected respectively to the inputs and load output terminals for delivering DC power to a load. The multi-phase harmonic neutralizing converter comprises a power switching converter having an input connected to the outputs of each of the first rectifiers, the inverter including an LC resonant circuit and an output. A plurality of second rectifiers having respective inputs connected to the output of the inverter through a plurality of respective transformers each have outputs that are connected in a voltage additive relationship to the outputs of the respective individual phase first rectifiers. The power switches of the inverter are shared among all of the phase stages to neutralize the three input power sources. These switches also control the flow of power to the DC load.

The LC resonant circuit of the harmonic neutralizing converter is a series resonant circuit. Use of series resonant technology is advantageous over pulse-width modulation for a multiplicity of reasons including lower switching losses, generation of little EMI, minimization of the number of high power components required for power conversion, and generation of an output current which is nearly proportional to the load voltage.

An advantage of the present invention is the provision of a power converter having harmonic neutralization using resonant converter topology to thereby gain several advantages over the use of PWM topology.

Another advantage is the provision of a harmonic neutralizing power converter having little or no switching losses.

Still another advantage is the provision of a harmonic neutralizing power converter using few high power components to thereby minimize the volume and weight of the converter.

Another advantage of the present invention is the provision of a power converter having harmonic neutralization using series resonant converter topology to capitalize on the nearly constant output current, independent of load voltage, generated by series resonant converters.

Still another advantage of the present invention is the provision of a harmonic neutralizing series resonant power converter which minimizes the production of current harmonics in the source, and which has nearly unity power factor operation.

A further advantage is that induction coupling can be easily accomplished, for example in battery charger applications.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
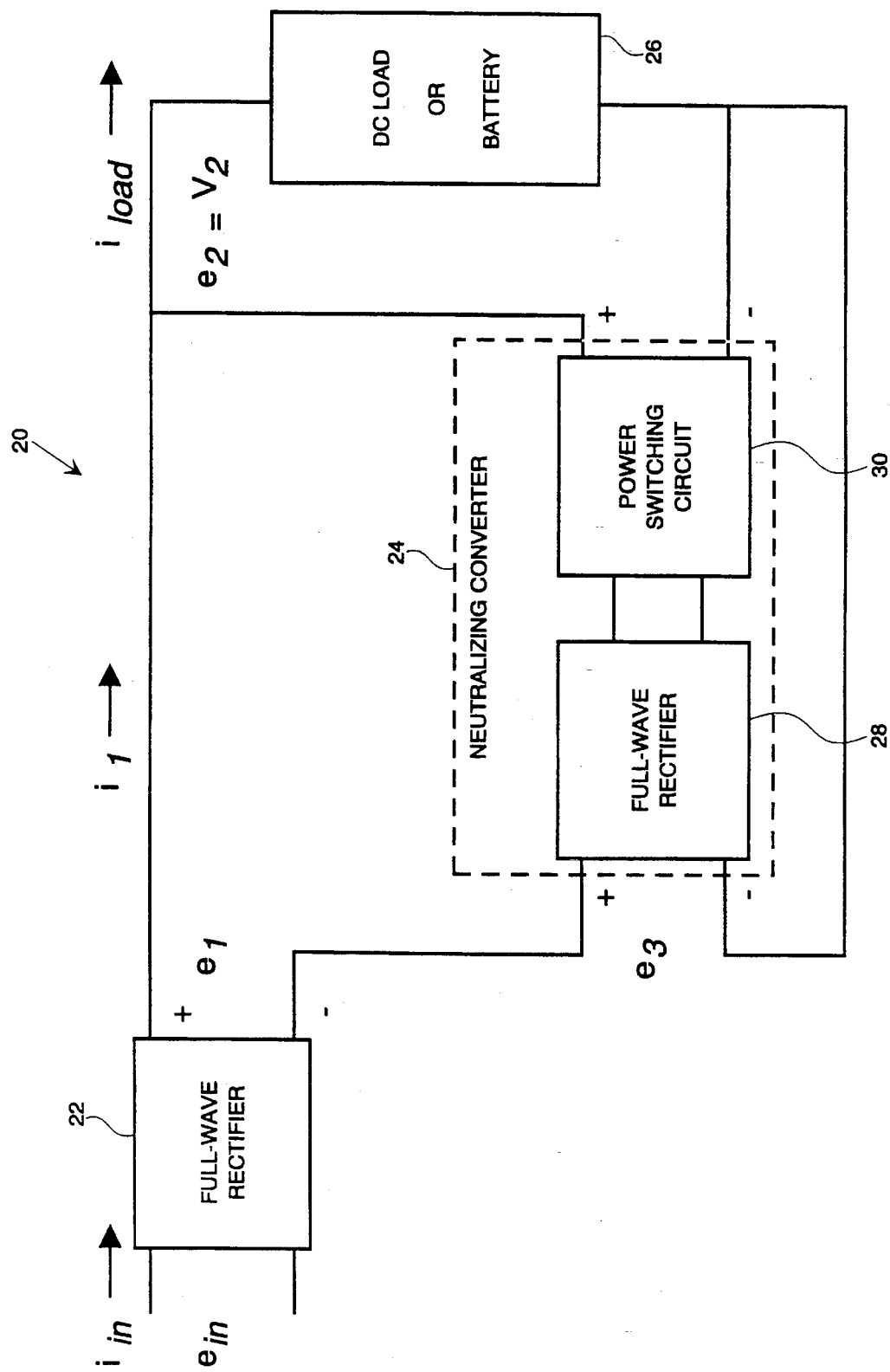
FIG. 1 is a block diagram of the general configuration of the harmonic neutralizing power converter of the present invention.

Referring now to the drawings and particularly to FIG. 1, there is shown a block diagram illustrating the general principles of the power converter of the present invention having harmonic neutralization. AC/DC converter circuit 20 comprises first full-wave rectifier 22, neutralizing converter 24, and load 26. First rectifier 22 includes an input for receipt of AC input power and an output. Load 26 may comprise a battery, for example, if AC/DC converter circuit 20 comprises a battery charger circuit. Neutralizing converter 24 includes second full-wave rectifier 28 and power switching inverter circuit 30. As is explained in greater detail hereinafter, the output voltage of neutralizing converter 24 is added to the output voltage of first rectifier 22 to equal the voltage of load 26. Specifically, power switching circuit 30 has an input connected to the output of first rectifier 22. Second rectifier 28 has an input connected to the output of power switching circuit 30, and an output connected in voltage additive relationship to the output of first rectifier 22. The added outputs of first and second rectifiers 22 and 28 are connected to the load output terminals of load 26. In this manner the output voltage on the load terminals of load 26 is substantially equal to the sum of the output voltages of both first rectifier 22 and second rectifier 28. Also, power switching circuit 30 of neutralizing converter 24 comprises an LC resonant converter. Use of a resonant converter allows the operating load line to be optimized for harmonic reduction. In fact, satisfactory harmonic reduction may be accomplished without loop control, i.e. with operation of the resonant converter at a fixed frequency.

Before considering the various embodiments of neutralizing converter 24 disclosed herein, it is useful to discuss the theoretical operation of AC/DC converter circuit 20 of FIG. 1. For perfect harmonic neutralization to be achieved, no current harmonics of the power source frequency are generated and the input current to the converter is not phase shifted from the input voltage—the power factor (PF) is unity and optimum.

For power supplied to first full-wave rectifier 22, input voltage, $e_{in}$, and input current, $i_{in}$, are:

$$e_{in}=V_1*\sin(2*pi*f*t) \quad (1)$$

$$I_{in}=I_1*\sin(2*pi*f*t)*\cos(theta) \quad (2)$$

where $V_1$ is a constant equal to the peak value of the input voltage sinusoid, f is the frequency of the input power (for example, 60 Hz), t is time, $I_1$ is a constant equal to the peak value of the input current sinusoid, and theta is the power factor angle. If neutralizing converter 24 provides perfect harmonic neutralization then theta is zero and input current, $i_{in}$, becomes:

$$i_{in}=I_1*\sin(2*pi*f*t) \quad (3)$$

Assuming that the rectifying process of first full-wave rectifier 22 is perfect, the output voltage from first rectifier 22, $e_1$, and the output current from first rectifier 22, $i_1$, are:

$$e_1=V_1*|F(t)| \quad (4)$$

$$i_1=I_1*|F(t)| \quad (A) \quad (5)$$

where $3F(t)3$ is the waveform resulting from first rectifier 22, and $|F(t)|$ is equal to $|\sin(2*pi*f*t)|$.

If one assumes that load voltage, $e_2$, is pure DC, then $$e_2=V_2=e_1+e_3 \quad (6)$$

where $e_3$ is the input voltage to neutralizing converter 24 and $V_2$ is a constant equal to the output voltage. Therefore, $$e_3=V_2-V_1*|F(t)| \quad (B) \quad (7)$$

Assuming that first and second rectifiers 22 and 28 and power switching circuit 30 are lossless, then the input power, $P_{in}$, and the output power, $P_{out}$, are:

$$P_{in}=e_{in}*i_{in}=[V_1*F(t)]*[I_1*F(t)] \quad (8)$$

$$P_{out}=V_2*[I_2*F^2(t)] \quad (9)$$

Note that input power, $P_{in}$, is a sine-squared function of time. Because neutralizing converter 24 has no energy storage capacity, output power, $P_{out}$, must also be, and is, a sine-squared function of time.

The output power of neutralizing converter 24, $PC_{out}$, is:

$$PC_{out}=e_3*i_1=[V_2-V_1*|F(t)|]*[I_1*|F(t)|] \quad (10)$$

$$PC_{out}=[V_2*I_1*|F(t)|]-[V_1*I_1*F^2(t)] \quad (11)$$

Though $V_2$ may be less than $V_1$, this requires that the neutralizing converter have bidirectional capability. To avoid complexity, such a bidirectional capability is not considered herein. Thus, $V_2$ is greater than or equal to $V_1$. If $V_2$ equals $V_1$, then $$PC_{out}=[V_1*I_1*|F(t)|]-[V_1,I_1*F^2(t)] \quad (12)$$

$$i_{load}=I_1*F^2(t) \quad (13)$$

If $V_2$ is greater than $V_1$, then $$PC_{out}=[V_2*I_1*|F(t)|]-[V_1*I_1,*F^2(t)] \quad (14)$$

$$i_{load}=I_2*F^2(t)=(V_1/V_2)*I_1*F^2(t) \quad (15)$$

The average handling capacity of neutralizing converter 24, $PC_{avg}$, determined by integrating equation (15) from t=0 to t=1/(2*f) is $$PC_{avg}=[2*V_2*i_1/pi]-[V_1*I_1/2] \quad (16)$$

$$PC_{avg}=V_1*I_1*(0.637\ V_2/V_1)-0.5) \quad (17)$$

The handling capacity of neutralizing converter 24 expressed in terms of per unit of power delivered to the load, $PC_{pu}$, is $$PC_{pu}=(1.273*V_2/V_1)-1$$

Thus, where $V_2=V_1$, $PC_{pu}=0.273$ meaning that neutralizing converter 24 handles less than 100% of the output power or, more specifically, approximately 27.3% of the output power.

To determine the load line requirements for neutralizing converter 24, determine the relationship between $e_3$ and $i_1$. Combining equations (A) and (B) above, $$e_3=V_2-(V_1*i_1/I_1)$$

Figure 2B:
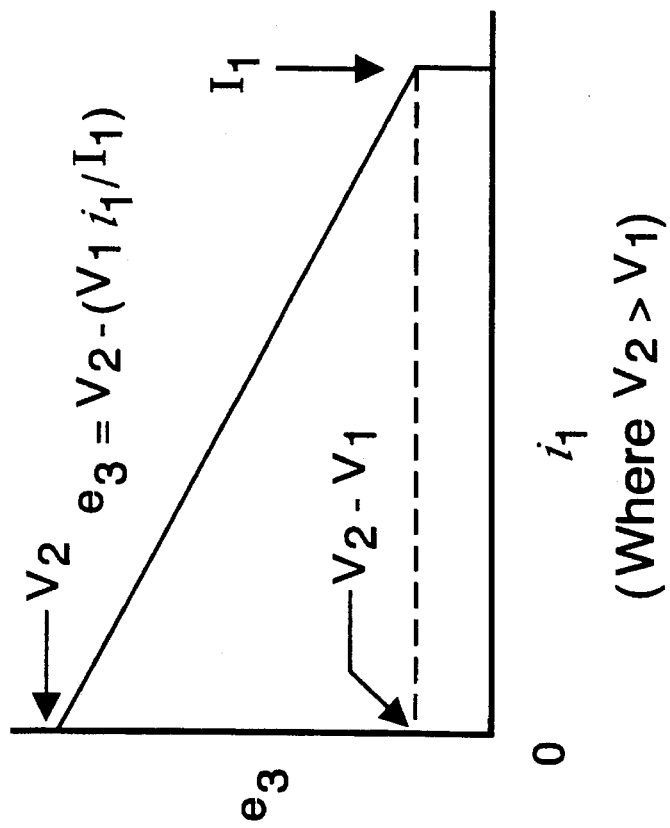
FIGS. 2A and 2B are graphs of the load line of the ideal harmonic neutralizing converter of the present invention under conditions in which the output voltage is equal to the peak of the input voltage sinusoid and greater than the peak of the input voltage sinusoid, respectively.
Figure 2A:
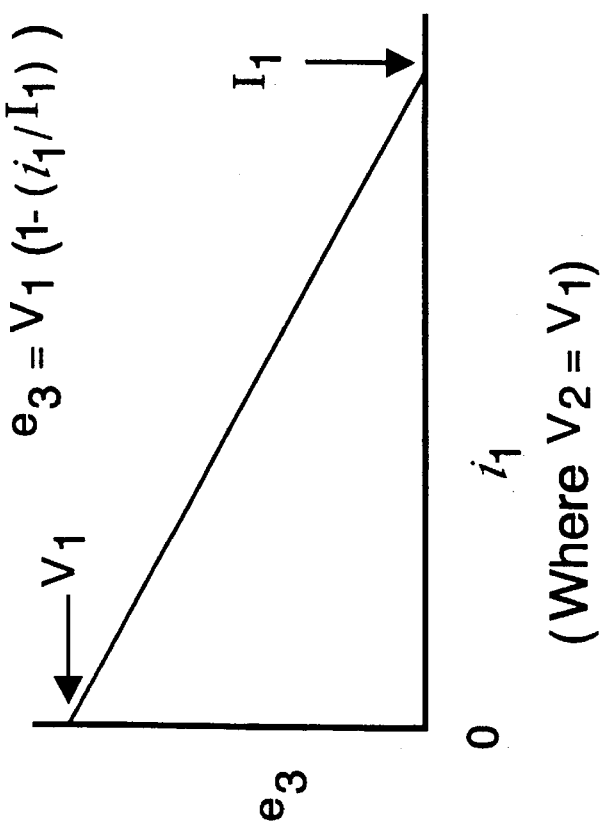

As expected, there is a linear relationship between output voltage $V_2$ and output current of neutralizing converter 24. This linear voltage-current load line relationship is illustrated in FIGS. 2A–2B. In FIG. 2A, $V_2$ is equal to $V_1$. In FIG. 2B, $V_2$ is greater than $V_1$.

Figure 3:
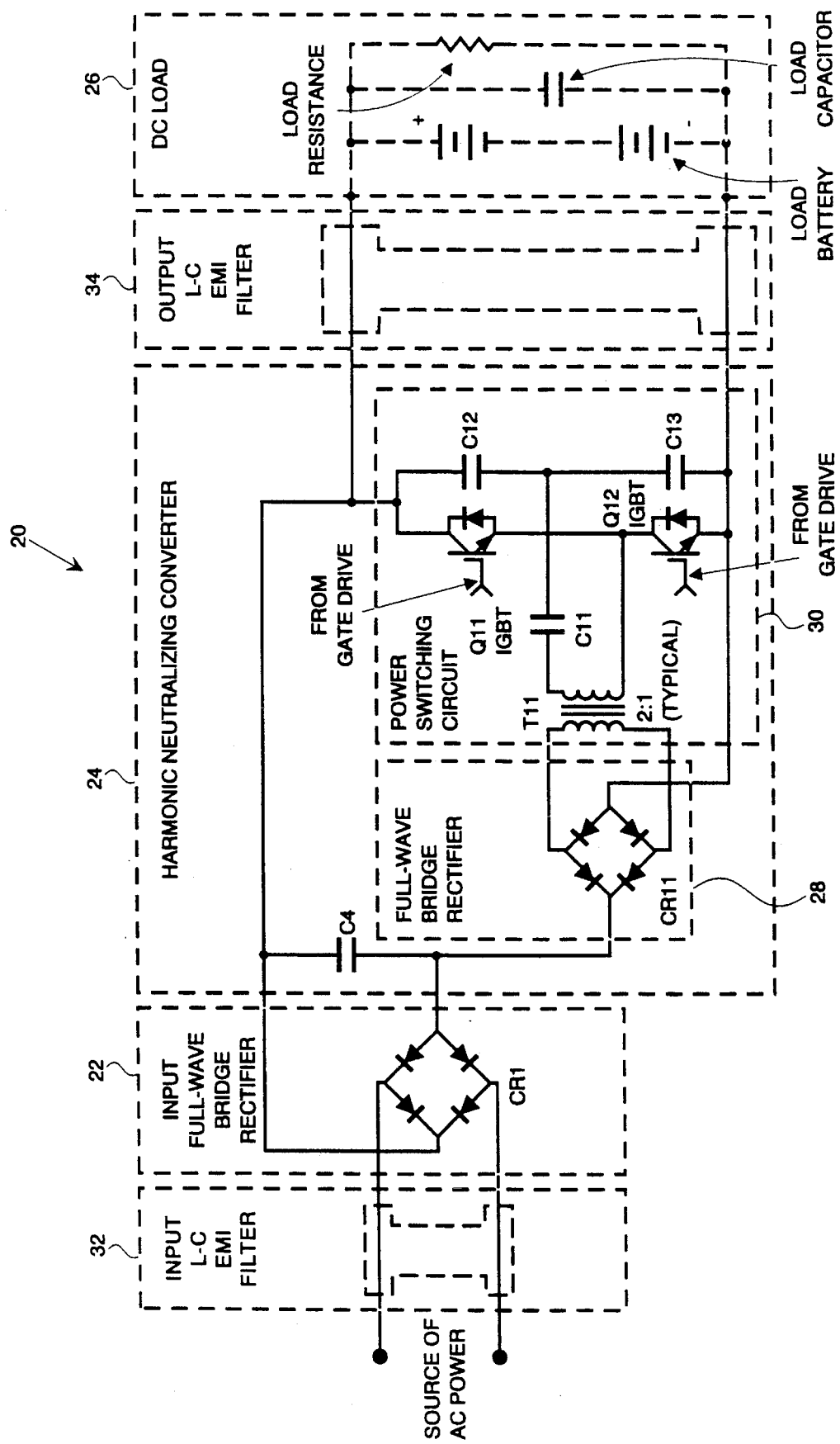
FIG. 3 is a schematic diagram of a single phase AC/DC power converter with harmonic neutralization illustrating the principles of the present invention.

Referring now to FIG. 3, there is shown a schematic diagram of a single phase AC/DC power converter with harmonic neutralization. AC/DC converter circuit 20 includes first full-wave bridge rectifier 22, harmonic neutralization circuit 24 and load 26, as previously described in the description of FIG. 1. AC/DC converter circuit 20 also comprises input filter 32 and output filter 34. Input power, typically from a 50 Hz or 60 Hz utility source, first flows through input filter 32 which reduces conducted common mode and conducted differential mode interference. The AC output from input filter 32 is then rectified by first full-wave bridge rectifier 22 (CR1) and filtered with a small amount of capacitance via C4 of neutralizing converter 24 to produce low impedance for the output current of neutralizing converter 24 and to filter the output current of neutralizing converter 24. Capacitor C4 is not intended to filter the low frequency pulsating DC from first rectifier 22.

Neutralizing converter 24 is connected to first rectifier 22 and load 26 so that the output voltage of neutralizing converter 24 is added to the output voltage of first rectifier 22 before reaching load 26. In this embodiment, AC/DC converter 20 also includes output filter 34 disposed between the output of neutralizing converter 24 and the input of load 26. Output filter 34, like input filter 32, is also intended to reduce interference of the output of neutralizing converter 24.

The load for neutralizing converter 24 is required to have energy storage capacity. Thus, in this embodiment, load 26 comprises a battery. Alternatively, the load may include a large amount of capacitance, for example. For neutralizing converter 24 to deliver output power to load 26, the source of power is to provide power to neutralizing converter 24 through first rectifier 22 at all points in the AC cycle. Further, though the input AC power fluctuates between a maximum value at the peak of each sinusoidal cycle and a zero value at zero crossing, the voltage across load 26 must remain nearly constant. Therefore, load 26 cyclically behaves as a power source for neutralizing converter 24 keeping the input voltage of neutralizing converter 24 nearly constant.

Figure 7:
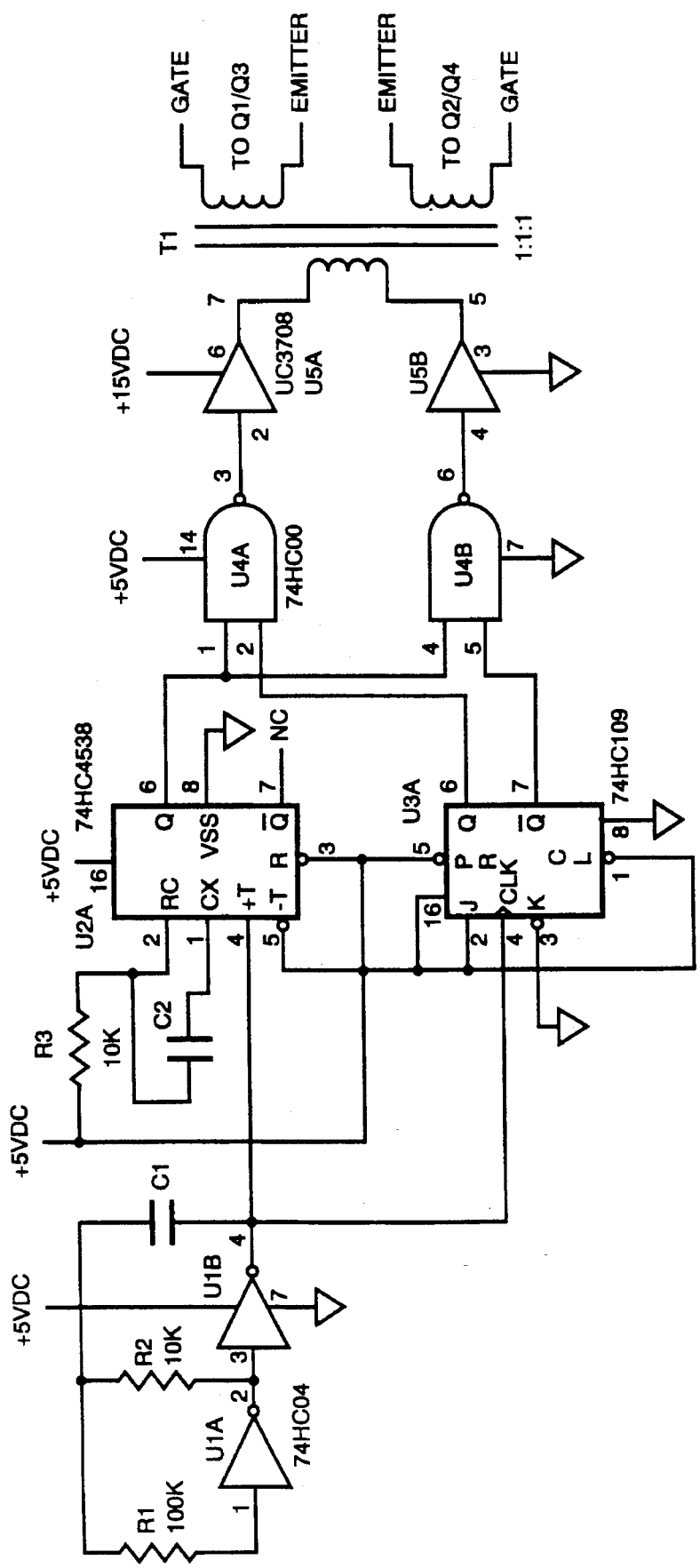
FIG. 7 is a schematic of a fixed frequency gate drive.
Figure 8:
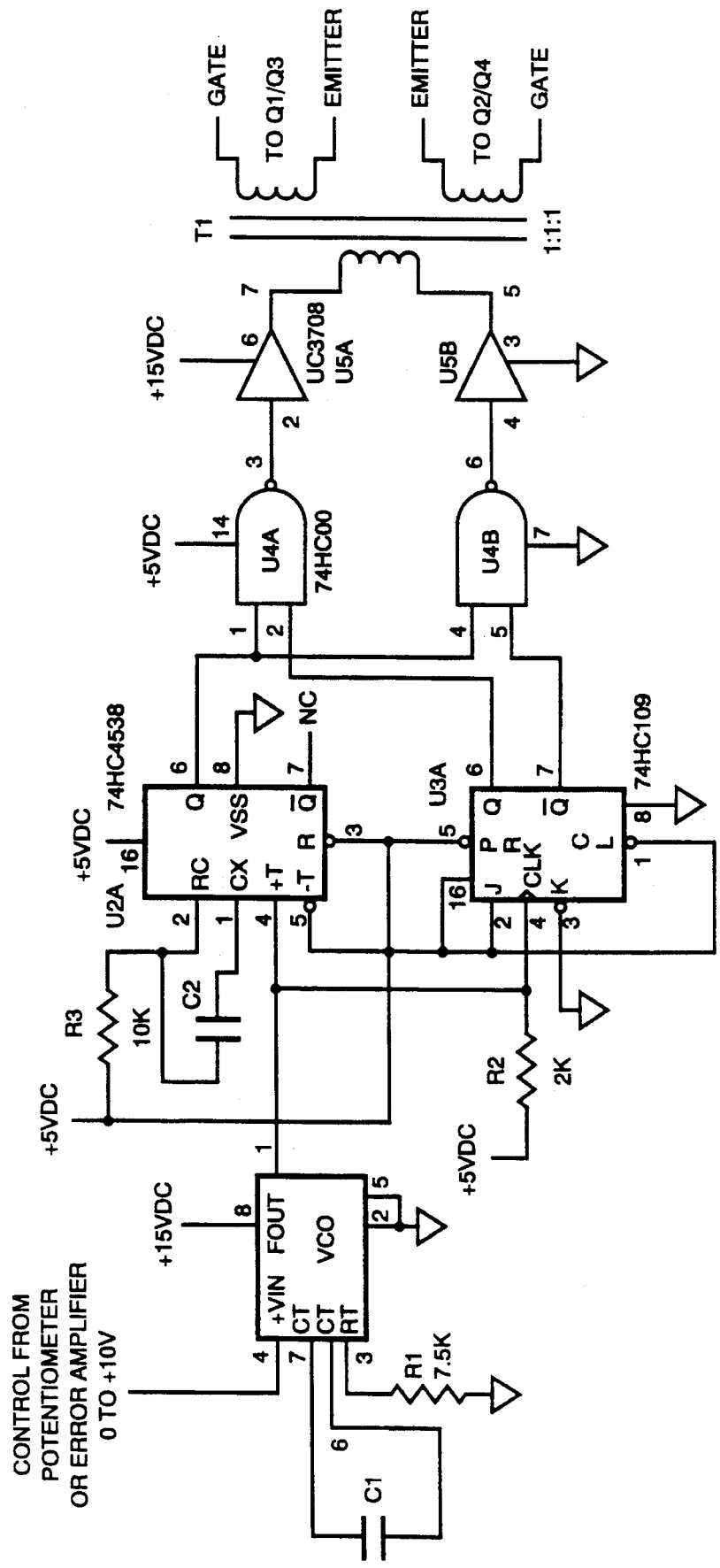
FIG. 8 is a schematic of a controlled frequency gate drive.

In this embodiment harmonic neutralizing converter 24 comprises second full-wave bridge rectifier 28 (CR11) and power switching circuit 30. Power switching circuit 30 includes transformer T11 at the output of converter 24 which isolates the output of neutralizing converter 24 from the input. As previously described, transformer T11 typically handles less than one-third of the total output power ($V_2$ is equal to or slightly greater than V1). Also, T11 operates at high frequency and therefore s small in size. Power switching circuit 30 also includes capacitor C11. Transformer T11 and capacitor C11 form a series resonant tank or series LC resonant circuit; the resonating inductance can be designed into transformer T11 as a combination of leakage and magnetizing inductance. In addition to transformer T11 and capacitor C11, power switching circuit 30 also includes IGBTs Q11 and Q12, or other appropriate semiconductor switching devices, and capacitors C12 and C13. IGBTs Q11 and Q12, which include antiparallel diodes, together with capacitors C12 and C13 form an inverter. As is well known in the art, the application of switching pulses to IGBTs Q11 and Q12 from a suitable pulse generator source as shown in FIG. 7 or FIG. 8 will deliver an AC signal of the appropriate frequency, typically with an IGBT power stage of 20 to 200 KHz, to resonant tank circuit C11, T11. FIG. 7 illustrates a fixed frequency gate drive pulse generator source wherein the value of C1 is chosen to provide the proper operating frequency of the power stage, and the value of C2 is chosen to provide the desired on-time for Q1/Q11 and Q2/Q12. FIG. 8 illustrates a controlled frequency gate drive when the values of C1 and C2 are chosen based on the same criteria as indicated above in connection with FIG. 7. Thus, power switching circuit 30 functions as a resonant DC to AC converter to provide to rectifier CR11 an AC signal that is rectified and added to the output from rectifier 22 to produce the desired charging voltage and current for battery 26.

The disclosures of co-pending patent applications Attorney Dockets G-10013, H-169113 and H-169109 entitled "Power Converter With Harmonic Neutralization" relating to other configurations of power converters sharing a certain commonality of architecture with the power converters of the present application are expressly incorporated herein by reference.

Figure 4:
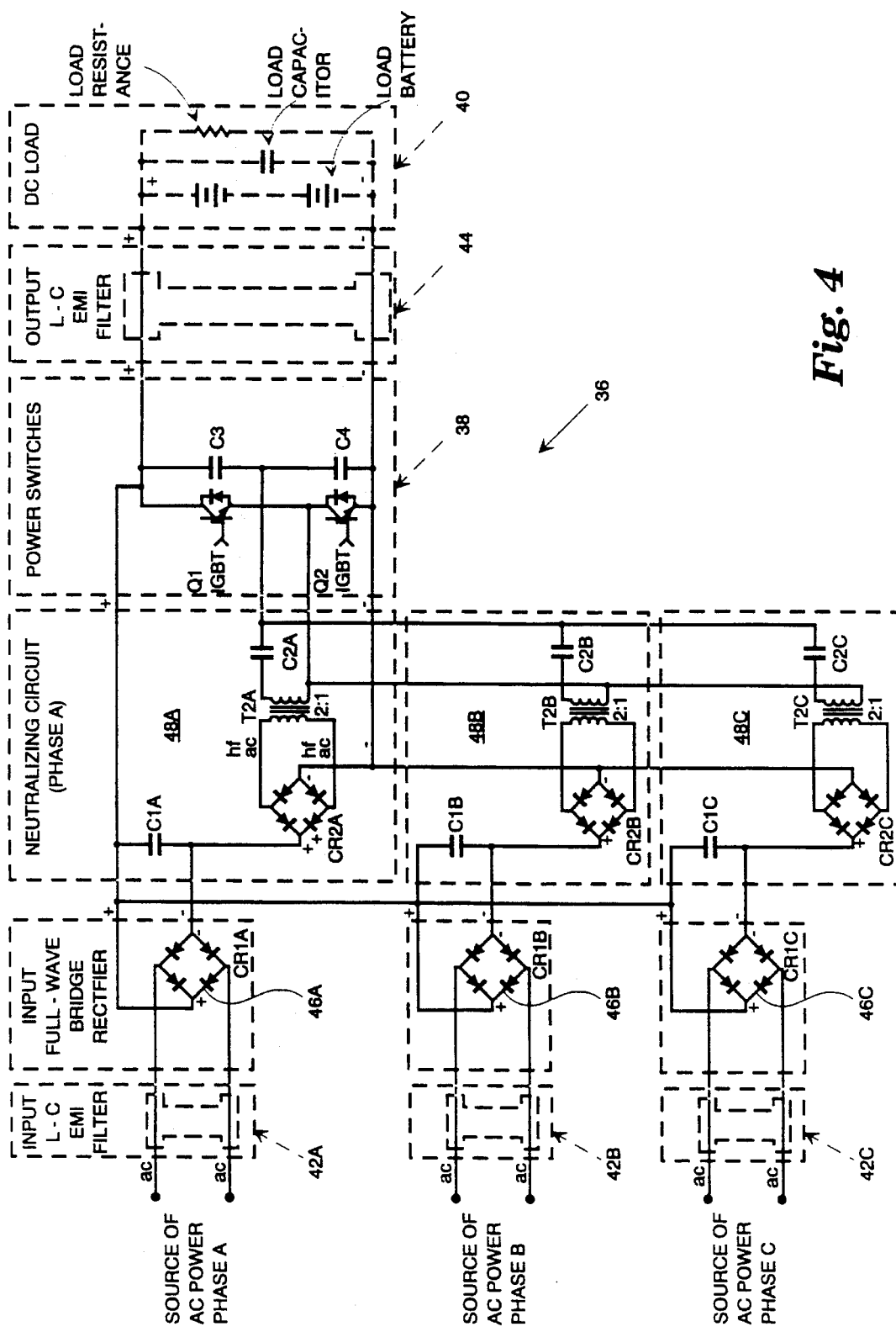
FIG. 4 is a schematic diagram of a battery charger circuit using one embodiment of the multi-phase harmonic neutralizing power converter of the present invention.

FIG. 4 is a schematic diagram of a battery charger utilizing one embodiment of the multi-phase power converter of the present invention. Specifically, AC/DC converter 36 has harmonic neutralization for each of its three input phases and is novel in that a single pair of power switches 38 is utilized to neutralize the three input power sources. Switches 38 also control the flow of power to the DC load 40. The advantage of this arrangement over known prior art power circuits is that it is able to simultaneously neutralize more than one input phase and provide load regulation by means of a circuit employing very few parts. For simplicity, only essential power circuit components are shown. Details of the three input EMI filters 42A, 42B and 42C and a single output EMI filter 44 are not shown because in practice, these filters are conventional low pass L-C filters.

Three separate single-phase full-wave bridge rectifiers 46A, 46B and 46C, one for each input phase, are utilized. It is required that there be isolation between the input phases if neutralization is to be accomplished. Thus, a six-wire input is shown. There should be either a single three phase isolation transformer or three single phase isolation transformers (not shown) connected ahead of the inputs to the circuitry of FIG. 4.

Neutralizing circuits 48A, 48B and 48C individually function identically as in neutralizing converter 24 in the single phase converter shown in FIG. 3 except that a single pair of power switches 38 are shared among the three phases, as illustrated. The input of power switching inverter 38 is connected to the load terminals of battery 40 to periodically receive energy from battery 40. Thus, the neutralizing converter of FIG. 4 functions to both control battery charging current and neutralize input harmonic current.

The DC load voltage must be equal to or greater than the peak value of the source voltages at the AC power inputs for proper neutralization. Power to the load 40 is controlled by change in the frequency of operation of Q1 and Q2. C1A, C1B and C1C are large enough in value to effectively bypass currents at the operating frequency of Q1 and Q2 (typically in the order of 100 kHz), but are small enough in value so as to conduct small currents at the second harmonic frequency of the sources, typically 120 Hz. Transformers T2A, T2B and T2C perform typically a one-to-two voltage step-up and provide isolation at the second harmonic of the source frequency. The design of the resonant tank circuits consisting of capacitors C2A, C2B and C2C and the leakage inductances of transformers T2A, T2B and T2C determine the maximum power output of the converter.

Like the single phase configuration shown in FIG. 3, even harmonics are effectively neutralized by the ± symmetry of the circuitry. However, unlike the single phase configuration, zero-phase (triplen) components (3rd, 6th, 9th, 12th, 15th, . . . harmonics) of input current do not flow in the six wire input circuit. Therefore, the only harmonic components which appear in the input currents are the 5th, 7th, 11th, 13th, 17th, etc. Therefore, the neutralizing tanks can be designed to minimize non-triplen harmonics only.

Figure 5:
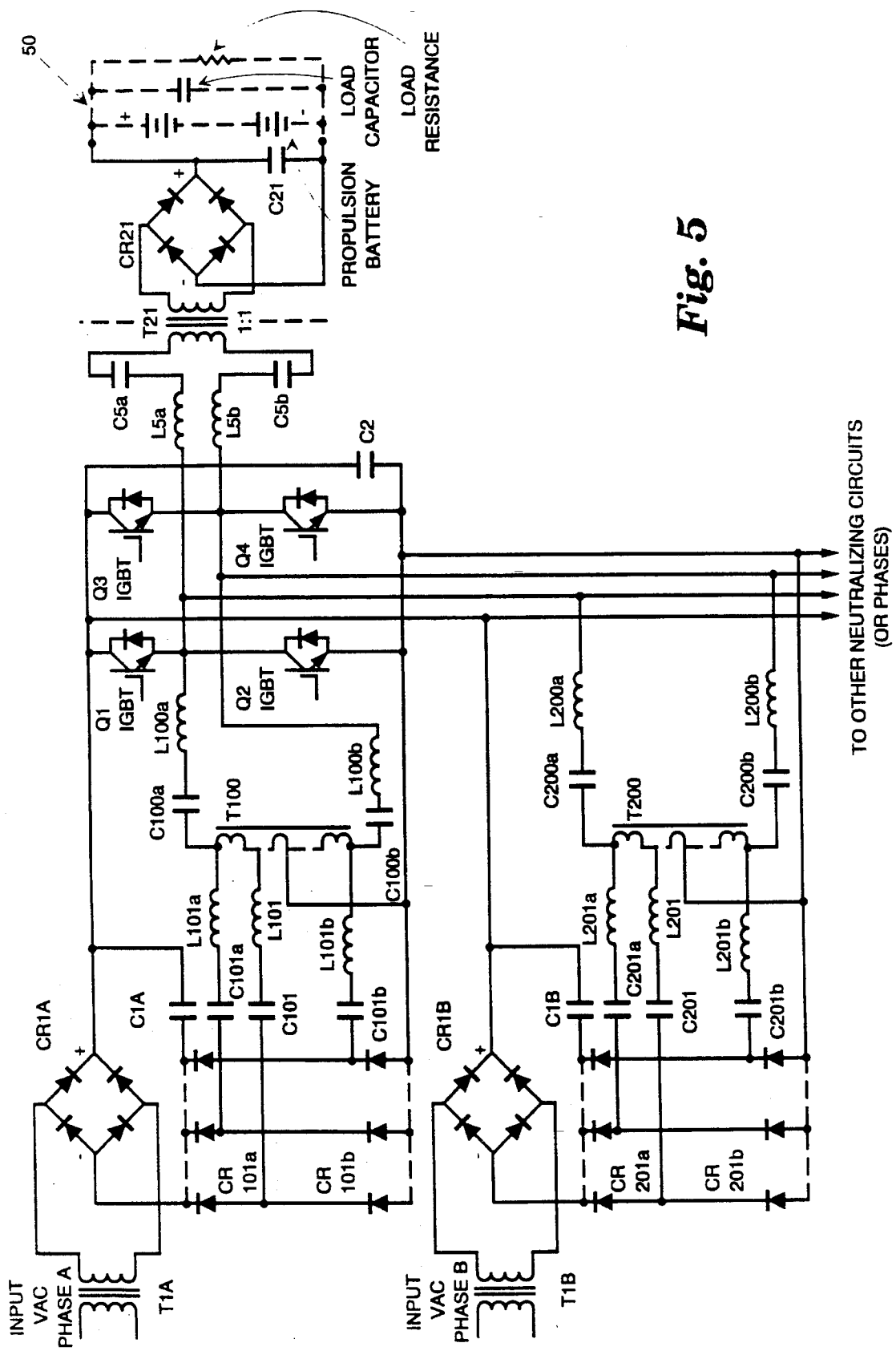
FIG. 5 is a schematic diagram of a battery charger circuit using a second embodiment of the multi-phase harmonic neutralizing power converter of the present invention.
Figure 6:
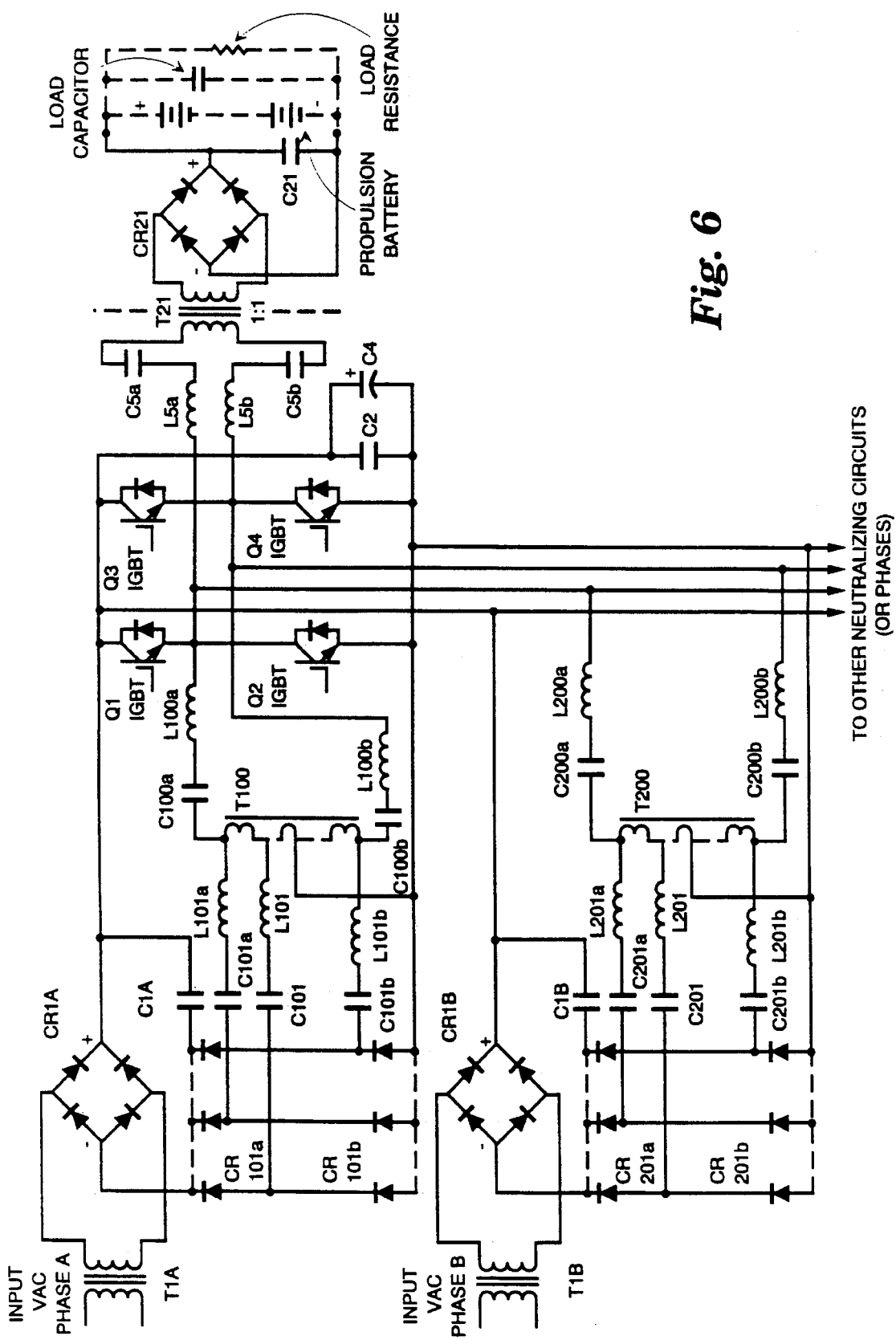
FIG. 6 is a schematic diagram of a battery charger circuit using a third embodiment of the multi-phase harmonic neutralizing power converter of the present invention.

The simple tanks comprising the leakage inductance of transformers T2A, T2B and T2C and capacitors C2A, C2B and C2C probably would not give adequate harmonic neutralization for many applications. However, the more sophisticated tanks shown in the embodiments of FIGS. 5 and 6 should provide adequate neutralization for the most demanding needs. Although the embodiment shown in FIG. 5 shows only two phases, it should be understood that the shared use of the power switches Q1, Q2, Q3 and Q4 enables any number of input phases to be neutralized with only one set of power switches. Thus, the variant configurations in FIGS. 5 and 6 are generalized to cover N-phase power sources, where N is 1, 2, 3, 4, 5, . . .

FIG. 5 is a schematic diagram of a first variant which improves the performance of the neutralizing converter. Special neutralizing autotransformers T100, T200 are utilized.

Neutralizing transformers T100, T200 are driven by an input resonant tank comprising capacitors C101 and C201 and discrete inductors L101 and L201. Capacitors C101 and C201 also provide a DC offset equal to one-half the voltage across capacitor C2, the bypass capacitor. The output of transformers T100 and T200 drive several L-C tanks, namely, tanks comprising C100a, C100b, C200a, C200b, L100a, L100b, L200a and L200b.

The configuration of FIG. 5 has an output isolation transformer T21 to the neutralizing converter. Inductors L5a and L5b and capacitors C5a and C5b are the associated resonant tank components and capacitors C100 and C200 provide DC blocking. The bootstrap use of the neutralizing converter is regenerative in behavior. Therefore, as the load voltage, for example in a propulsion battery, is allowed to increase, the output of the neutralizing converter increases proportionately. An increase in the output of the neutralizing converter causes an increase in the load voltage. Thus, it is mandatory that the load be receptive and limit its voltage appropriately. If this cannot be ensured, over-voltage protection is necessary. Over-voltage sensing can be used to lower the output of the neutralizing converter, typically by reducing converter operating frequency.

Since the configuration of FIG. 5 is indirectly coupled to load 50 through the tank circuit and transformer T21, regenerative runaway is an increased threat. To permit safe operation over a wide range of load voltage, tanks L5a, C5a and L5b, C5b should be designed with an unusually low characteristic impedance. Thus, the output circuit closely exhibits a voltage source characteristic. The output load tank operation can be at approximately 0.5 times the resonant frequency. Alternatively, because the output load tank is operated in a "current starved" mode, the operating frequency can be increased as high as 0.9 times the resonant frequency without the onset of hard switching. The operation of the neutralizing tank results in zero current, i.e., soft, switching. Likewise, the operation of the output load tank in a "current starved" mode results in zero current switching.

The configuration shown in FIG. 5 is a balanced design utilizing full-bridge switching, and offers low EMI production, even at high power levels. The voltage (at 100 Hz or 120 Hz) across capacitor C2 is known as the DC link voltage. Where the link is poorly filtered, such as when capacitor C2 is relatively small, the link has a high ripple voltage at the second harmonic of the source of the AC power. Thus, this configuration provides an output current waveform that is generally sine-squared. The average valve of the link voltage is within a few volts of the battery voltage.

In general BJT's MOSFET's MCT's or IGBT's can be used for Q1, Q2, Q3 and Q4. It is believed that IGBT's offer the best performance tradeoffs in high power applications. For this reason, and to ensure the low EMI production associated with soft switching, the following are used:

a) on-state gate drive for approximately 90% of each operating half-cycle;

b) Q1 and Q4 have identical timing (likewise Q2 and Q3);

c) switching operation at approximately 50% of the resonant frequency of the combined neutralizing resonant tanks (C101, L101, C100a, L100a, etc., for each phase);

d) switching operation at 50% to 90% of the resonant frequency of the induction port tank(s) (C5, L5, T21). Note that sufficient on-time for the gate drive ensures the independence of the currents in the neutralizing tanks from those in the induction port, where induction coupling through transformer T21 is used to charge batteries 50.

For the case where the number of phases equals 3 (or an integer number times 3, e.g. 6 or 9), it can be easily shown that there is constant power delivery to the load—a fundamental property of three phase power systems. Thus, the link voltage established across capacitor C2 has no ripple at the frequency of the second harmonic of the source. Pure DC is applied to the load without the need for filtering the link.

A novel feature of the circuit of FIG. 5 is the shared function of power switches Q1, Q2, Q3 and Q4 for two or more phases of the input power.

The configuration as shown in FIG. 6 is similar to the configuration of FIG. 5 but adds a large amount of capacitance across the DC link by providing a second capacitor C4 connected in parallel with capacitor C2. Capacitor C4 has a value of typically several thousand microfarads. As C4 is increased in value above a few hundred microfarads, link ripple is decreased and the battery charge current waveform approaches pure DC. The quality of the input current harmonic neutralization and the output power have been found to be quite independent of the value of C4.

Figure 9:
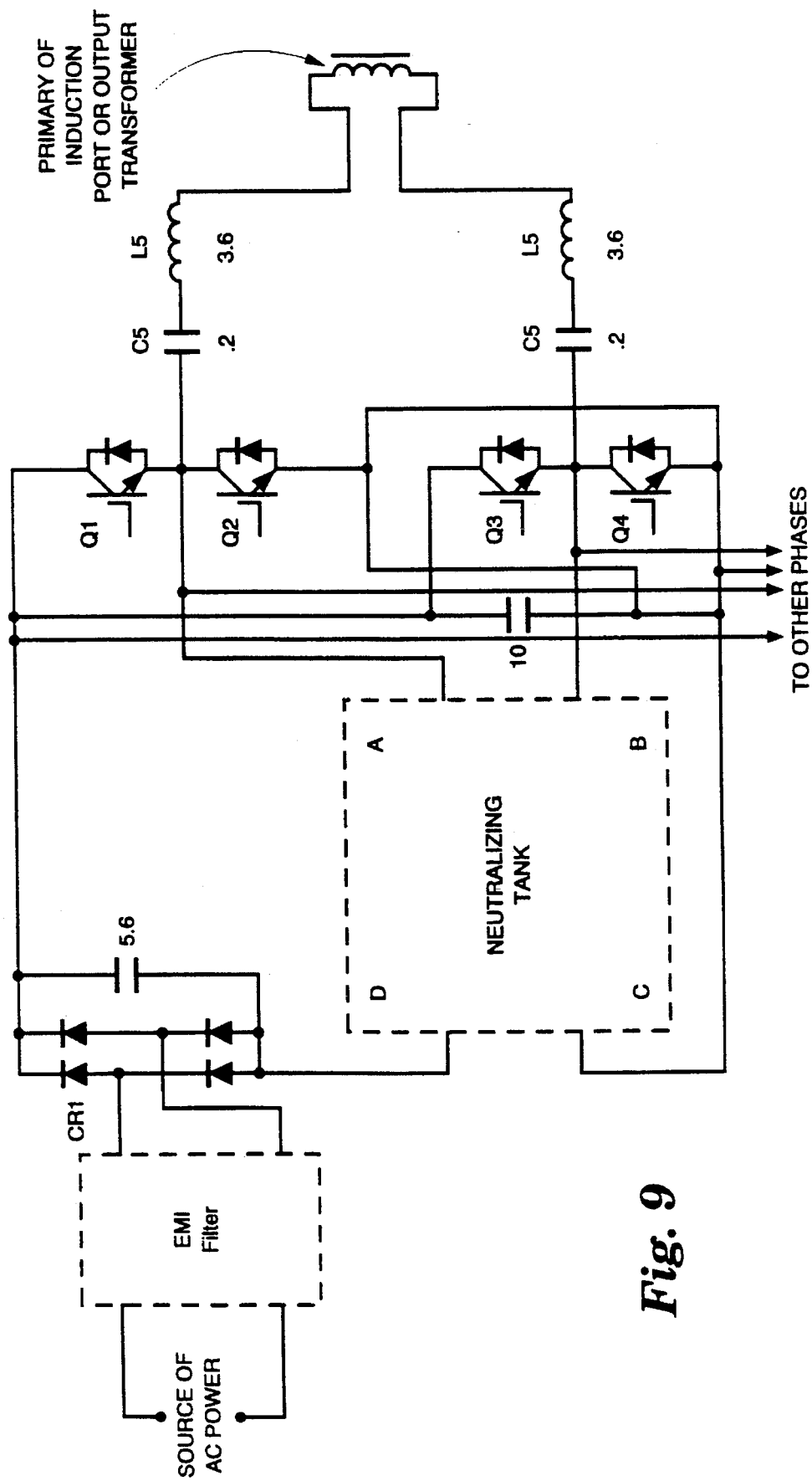
FIG. 9 is a schematic diagram of a further embodiment of a battery charger circuit according to the present invention.

FIG. 9 is a simplified diagram of one phase of a 1500 watt multi-phase battery charger having a source of AC power at 120 Vac at 60 Hz and operating at 125 kHz and having the component values illustrated. The operation of the battery charger of FIG. 9 is substantially the same as the previous embodiments, but includes one of two alternative neutralizing tanks including autotransformers illustrated in FIGS. 10 and 11.

Figure 10:
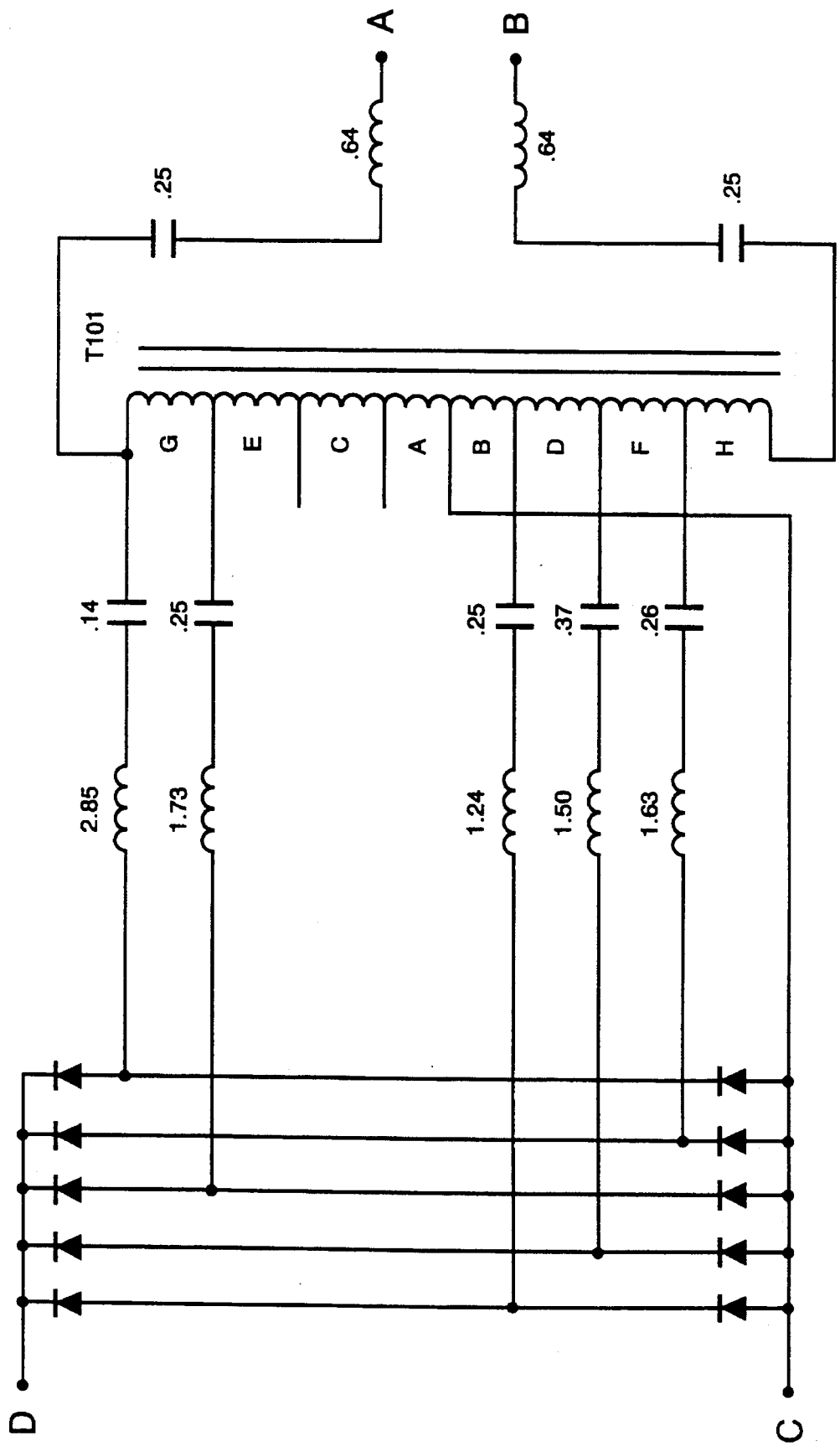
FIG. 10 is a schematic diagram of a neutralizing tank circuit utilizing a symmetric autotransformer for use in the circuit of FIG. 9.

FIG. 10 is a schematic diagram of a neutralizing tank circuit which utilizes a symmetric autotransformer T101 wherein windings A and B each have three turns and windings C, D, E, F, G and H each have four turns. Windings A+C+E+G=15 turns, and windings B+D+F+H=15 turns. The circuit of FIG. 10 produces a stepped approximation to a sine wave of input current.

Figure 11:
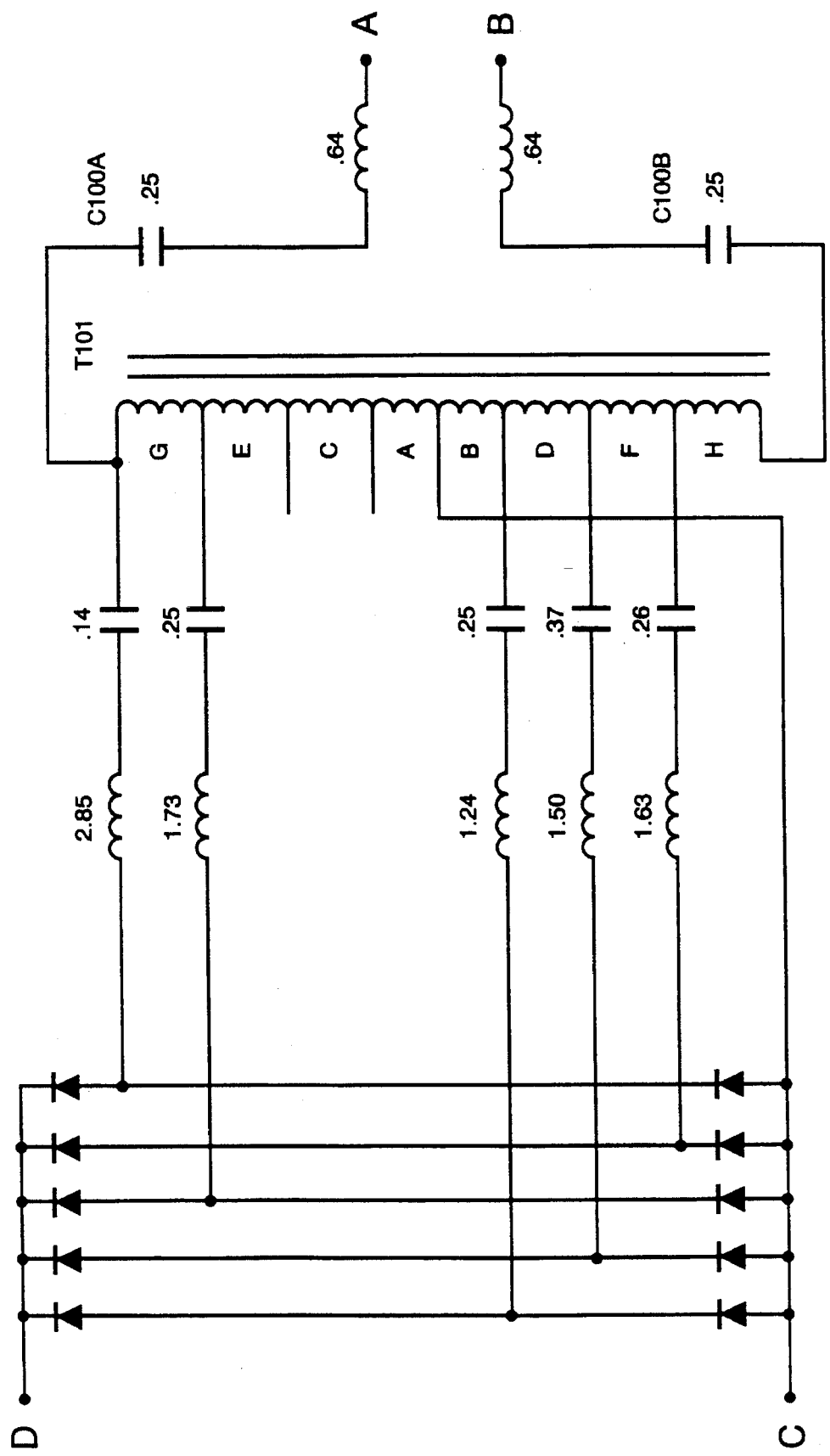
FIG. 11 is a schematic diagram of a neutralizing tank circuit utilizing an asymmetric transformer for use in the circuit of FIG. 9.

FIG. 11 is a schematic diagram of a neutralizing tank circuit which utilizes an asymmetric transformer 101, which is asymmetric with respect to its drive. The circuit components have the values indicated, and in autotransformer T101, winding A has two turns and windings B, C, D, F, G and H each have four turns. Windings A+C+E+G comprise fourteen turns and windings B+D+F+H comprise 16 turns. If autotransformer T101 were directly coupled to the power switches, it would have to support direct current, which would result in less than desirable functioning. However, because it is capacitively coupled through resonating capacitors C100A and C100B, there is no direct current produced in its drive. The value in the asymmetric (as opposed to the symmetric) autotransformer is that, when its taps and tank components are carefully chosen, an interpolation or smoothing of the steps results. This causes a marked reduction in the harmonic current components of input current. Total harmonic distortion THD in the range of 2% to 6% can be achieved. Autotransformer T101, in respects other than its asymmetry, is constructed in a conventional manner. For consistency in its reproduction, it is desirable to design it with low leakage between its windings. In particular, it may be desirable to ensure that the leakage is low between windings A and B, B and C, C and D, D and E, E and F, F and G, and G and H. Layered windings using litz wire within a ferrite pot core will work well.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A multi-phase AC to DC power converter comprising:

a plurality of inputs for respective phases of a multi-phase source of AC power, a plurality of first rectifiers connected respectively to said inputs, each said first rectifier having an output, load output terminals connected to said first rectifiers for delivering DC power to a load, a multi-phase harmonic neutralizing converter comprising a power switching inverter having an input connected to the outputs of each of said first rectifiers, said inverter including LC resonant circuits and outputs associated with respective said first rectifiers, said harmonic converter further comprising a plurality of second rectifiers having respective inputs connected to the respective outputs of said inverter through a plurality of respective transformers, each of said second rectifiers having an output connected in a voltage additive relationship to the output of the respective individual phase first rectifier, each respective added outputs of respective said first and second rectifiers connected to said load terminals.

2. The power converter of claim 1 wherein said inverter includes switching means for converting DC input from said first rectifiers to an AC output through said LC resonant circuits.

3. The power converter of claim 1 wherein said load comprises a battery connected to said load terminals, and the input of said power switching inverter is connected to said load terminals to receive energy from said battery.

4. The power converter of claim 1 wherein each said transformer is an autotransformer.

5. The power converter of claim 4 wherein said load comprises a battery connected to said load terminals, and the input of said power switching inverter is connected to said load terminals to receive energy from said battery.

6. The power converter of claim 4 further comprising an isolating transformer connected between said neutralizing converter and said load terminals to thereby provide for inductive coupling of power to said load terminals.

7. The power converter of claim 6 including a further LC resonant circuit connected to an input of said isolating transformer and a third rectifier connected to an output of said isolating transformer.

8. The power converter of claim 4 including a plurality of second LC resonant circuits driven respectively by said autotransformers.

9. The power converter of claim 4 wherein said autotransformer is asymmetric.

10. A multi-phase AC to DC power converter comprising:

a plurality of inputs for respective phases of a multi-phase source of AC power, a plurality of first rectifiers connected respectively to said inputs, each said first rectifier having an output, load output terminals connected to said first rectifiers for delivering DC power to a load, a multi-phase, harmonic neutralizing converter comprising a power inverter using full bridge switching and having an input connected to the outputs of each of said first rectifiers, and a plurality of autotransformers, said neutralizing converter comprising a plurality of sets of LC resonant circuits associated respectively with said first rectifiers, each of said sets of LC resonant circuits comprising a plurality of LC resonant circuits connected respectively to separate inputs of the respective said autotransformer and further comprising a second rectifier having an input connected to an output of said converter through the respective autotransformer and having an output connected in a voltage additive relationship to the output of the respective first rectifier, each respective added outputs of respective said first and second rectifiers connected to said load terminals.

11. The power converter of claim 10 further comprising an isolating transformer connected between said neutralizing converter and said load terminals to thereby provide for inductive coupling of power to said load terminals.

12. The power converter of claim 11 including a pair of further LC resonant circuits connected respectively to opposite input terminals of said isolating transformer and a third rectifier connected to an output of said isolating transformer.

13. The power converter of claim 10 wherein said autotransformers are asymmetric.

14. A multi-phase AC to DC power converter comprising:

a plurality of inputs for respective phases of a multi-phase source of AC power, load terminals for delivering DC power to a load, a multi-phase converter means connected between said inputs and said load terminals for converting AC voltage to DC voltage and harmonically neutralizing said multi-phase source of AC power, said converter means comprising an inverter means having an input connected to said load terminals, said inverter means having a single set of power switches shared among all phase stages of the power converter for neutralizing all of said power sources and controlling the flow of power to said load terminals.

15. The power converter of claim 14 wherein said power switches simultaneously neutralize the AC input power on each of said inputs and regulate the flow of power to said load terminals.

16. The power converter of claim 1 wherein said power switching inverter simultaneously neutralizes the AC power on each of said inputs and regulates the flow of power to said load output terminals.

* * * * *